Aug. 6, 1968   J. STRANGE   3,395,602
SELF-THREADING NUT
Filed June 28, 1966   3 Sheets-Sheet 1

INVENTOR.
JOHN STRANGE
BY
Jeare, Jeare & Sammon
ATTORNEYS

Aug. 6, 1968    J. STRANGE    3,395,602
SELF-THREADING NUT
Filed June 28, 1966    3 Sheets-Sheet 2

INVENTOR.
JOHN STRANGE
BY
Teare, Teare & Sammon
ATTORNEYS though made in accordance with the invention;

United States Patent Office 3,395,602
Patented Aug. 6, 1968

3,395,602
SELF-THREADING NUT
John Strange, Llanishen, Cardiff, Wales, assignor to Tinnerman Products, Inc., Cleveland, Ohio, a corporation of Ohio
Filed June 28, 1966, Ser. No. 561,159
Claims priority, application Great Britain, July 5, 1965, 28,406/65
13 Claims. (Cl. 85—32)

ABSTRACT OF THE DISCLOSURE

A self-threading fastening device including a base having a stud-receiving opening therein, a pair of oppositely disposed upstanding guide flanges extending upwardly from the periphery of the opening in the base, and each of the flanges including an inclined thread cutting projection formed from the material thereof. In one form, the polymeric nut-like body of polymeric material is disposed to encapsulate the device which has a bore in alignment with the opening in the base and into which the thread cutting projections extend. In another form, a deformable polymeric sealing member is disposed on the underside of the base for liquid sealing engagement with a support member.

---

This invention relates to self-threading fasteners adapted for mounting on threadless studs, rods, shafts or the like (hereinafter referred to as "studs"). Such fasteners are useful, for example, in conjunction with a support member having a protruding stud for retaining an article such as an apertured panel on the support member.

An object of the invention is to provide a self-threading fastener which is exceptionally easy and economical to produce, reliable in operation and can readily be modified, e.g. by incorporation in a plastics moulding, for applications where a seal against the intrusion of liquids is required.

The invention provides a self-threading fastener for mounting on a stud, the fastener being formed from a single piece of sheet metal and comprising a base having a stud-receiving opening therein, at least two upstanding guide flanges extending from the periphery of the opening on the same side of the base so as to lie substantially parallel to the surface of a stud received therethrough, and a thread-cutting projection formed on and extending inwardly from the inner face of each guide flange.

Each thread-cutting projection may be angularly disposed in relation to the axis of a co-operating stud, with a leading portion and a trailing portion such that the height and thickness of the projection increases progressively from the leading portion to the trailing portion.

The invention also includes the said fastener encapsulated in a plastics moulding shaped to form a self-threading nut, the bore of the nut being aligned with the opening in the base of the fastener, and the thread-cutting projections extending into the bore so as to cut into the outer surface of a stud introduced into the nut bore. The bearing end of the nut may have an external inclined rim adapted to make liquid-sealing contact with an article such as a panel when the nut is turned down a stud against the panel.

As an alternative to encapsulation, ingress of moisture through the co-operating panel aperture may be impeded or prevented by simply providing deformable sealing means on the side of the base opposed to that from which the guide flanges extend.

In order that the invention may be clearly understood, embodiments thereof will now be described by way of example only with reference to the accompanying drawings, in which.

Corresponding parts are given the same reference numerals in the different figures.

Figure 1:
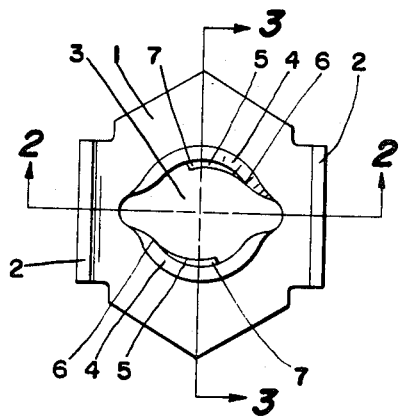
FIGURE 1 is a plan view of a first embodiment of self-threading fastener made in accordance with the invention.
Figure 2:
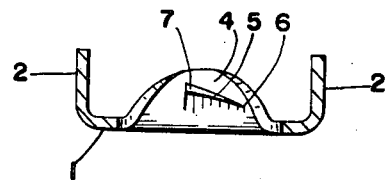
FIGURE 2 is a cross-sectional view taken along the line II—II of FIGURE 1.
Figure 3:
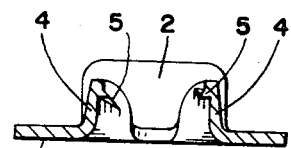
FIGURE 3 is a similar view taken along the line III—III in FIGURE 1.

Referring now to FIGURES 1 to 3 of the drawings, the self-threading fastener shown therein is formed from a single piece of sheet metal such as heat-treatable spring steel. The fastener comprises a base 1 which in this instance is of generally hexagonal shape suitable for co-operation with a conventional box spanner; two opposed edges of the base are turned upwardly to form lips 2 designed to allow the fastener to be mounted on a stud by the application tool of FIGURE 8, as further described below, constituting an alternative to the spanner.

The base 1 has a stud-receiving opening 3 therein, and a pair of upstanding guide flanges 4 extend from the periphery of the opening 3 on the same side of the base 1 so as to lie substantially parallel to the surface of a stud received therethrough. More specifically, and as shown in FIGURES 1 to 3, the flanges 4 are curved in elevation, and also in plan so as generally to follow the curvature of the co-operating stud. As illustrated in FIGURE 3, the flanges converge slightly towards one another as they leave the base 1, and their lateral separation at their extremities is arranged to be approximately equal to the diameter of the stud whereas their separation at the base 1 may be approximately 5% greater than the diameter of the stud. This aids in manufacture of the fastener, as further described below.

The fastener includes a pair of thread-cutting projections 5 each formed on and extending inwardly from the inner face of a corresponding flange 4. The projections are preferably formed by shaving or displacing the metal of the inner faces of the flanges 4 by means of a suitable tool. Each projection 5 commences at a leading end 6 and extends angularly upwardly (FIGURE 2) relative to the general plane of the base 1 and the axis of a co-operating stud, towards a trailing end 7. At the same time, of course, the projection follows the general curve of the associated flange and of the periphery of the opening 3. The thickness or axial width of each projection increases from the leading end to the trailing end, as does its height or radial depth as shown in FIGURE 1. Viewed in plan, the distance between leading ends 6 of the opposed projections 5 should be slightly greater than the transverse dimension of the stud to which the fastener is to be applied, and this distance should progressively diminish until the separation of the trailing ends 7 is less than the transverse dimension of the stud. The projections thus function to form uniform helical two-start threads in the outer surface of the stud as the fastener is turned down it; during this assembly, the flanges 4 serve as guides to ensure that the fastener is properly positioned relative to the stud.

Figure 4:
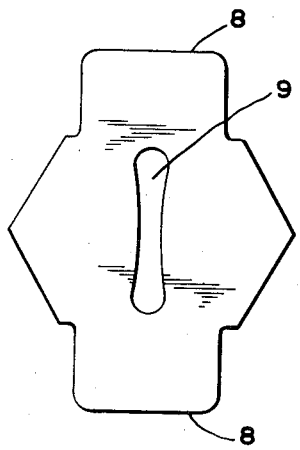
FIGURE 4 is a plan view of the blank from which the fastener of FIGURES 1 to 3 is constructed.

The fastener can be easily manufactured from the blank shown in FIGURE 4. The blank is cut from sheet metal to a generally hexagonal shape, two opposite sides 8 of the hexagon being displaced outwardly to allow them to be turned up to form the lips 2 of FIGURE 1. A slot 9 is formed at the centre of the blank, of a length a little greater than the diameter of the eventual opening 3. A punch is then used to upset the metal on either side of the slot 9 and form the oppositely disposed guide flanges 4. A further punch, provided with appropriately shaped lateral projections, can then be used to shave metal from the inside faces of the flanges to produce the thread-cutting projections 5. The fact that the flanges 4 converge slightly away from the base 1, as mentioned above, makes it possible for this further or "shaving" punch to have parallel flanks and to displace progressively more material at the trailing ends 7 of the projections.

Figure 5:
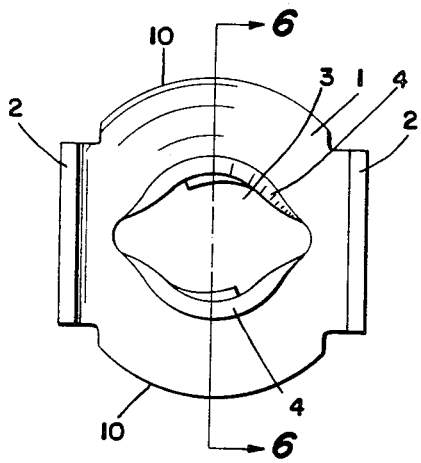
FIGURE 5 is a plan view similar to FIGURE 1 of a slightly modified form of fastener.
Figure 6:
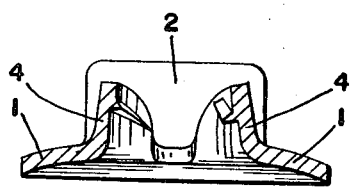
FIGURE 6 is a cross-sectional view taken along the line VI—VI of FIGURE 5.

The fastener shown in FIGURES 5 and 6 is very similar to that described above, except that the base 1 is no longer hexagonal in shape. The lips 2 are provided in the same way, but between the lips the external periphery 10 of the base is part-circular to facilitate tooling. In addition, and as shown in FIGURE 6, the base 1 may be arched slightly to effect tension between the fastener and a panel or other article to be secured in place by the fastener when turned down a stud into abutment with the panel. The part-circular base periphery 10 has the further advantage that it minimises "scoring" of the panel during final tightening. The modified fastener of FIGURE 7 likewise resembles that of FIGURES 1 to 3 except that in this embodiment the hexagonal shape of the base 1 is emphasized by turning up the edges 11 of the hexagon and omitting the lips 2 of the other fasteners described above.

Figure 7:
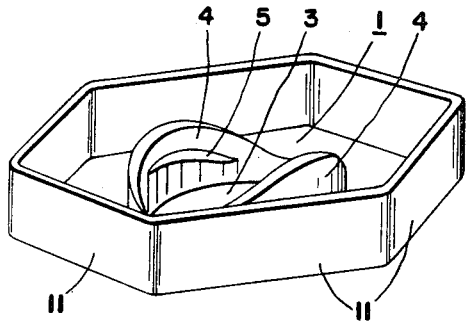
FIGURE 7 is a perspective view of a further modified form of fastener in accordance with the invention.
Figure 8:
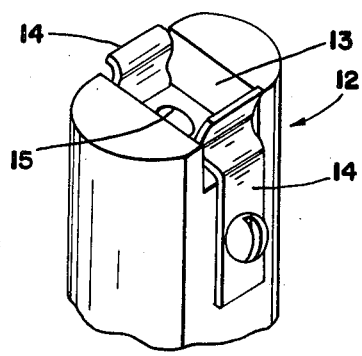
FIGURE 8 is a scrap view showing in perspective the head of an application tool which can be used in connection with the fastener of FIGURES 1 to 3 or FIGURES 5 to 6.
Figure 9:
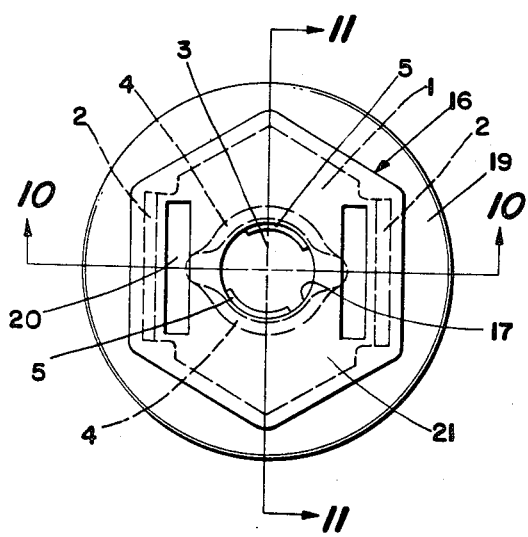
FIGURE 9 is a plan view of the fastener of FIGURES 1 to 3 encapsulated in a plastics moulding shaped to form a self-threading nut.
Figure 10:
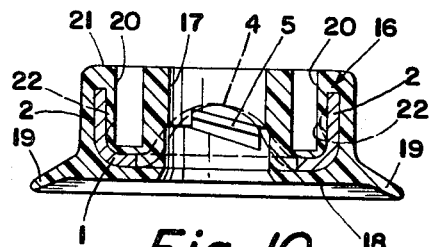
FIGURE 10 is a cross-sectional view taken along the line X—X of FIGURE 9.
Figure 11:
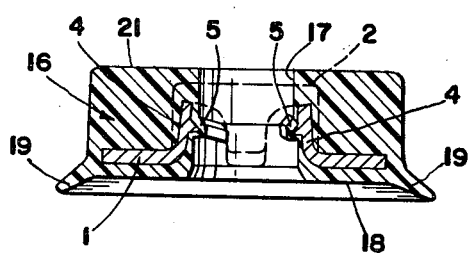
FIGURE 11 is a cross-sectional view taken along the line XI—XI of FIGURE 9.
Figure 12:
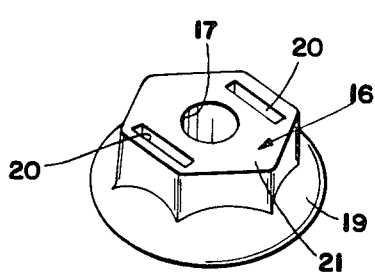
FIGURE 12 is a perspective view of the self-threading nut of FIGURES 9 to 11.

An ordinary box spanner may be used to apply the fastener of FIGURE 7 to a stud, and such a spanner may also be used in conjunction with the embodiment of FIGURES 1 to 3. The fastener of FIGURES 1 to 3, however, may be more conveniently turned down a stud by using the application tool shown in FIGURE 8 and this tool is also suitable for use with the fastener shown in FIGURES 5 and 6. As illustrated in FIGURE 8, the head 12 of the application tool is generally rod-like in form and is provided at its end with a diametrically extending slot 13 of rectangular cross-section. The width of the slot 13 is slightly greater than the width of the lips 2 of the fastener, so that the fastener may be placed upside-down (as viewed in FIGURES 2 and 6) against the end of the application tool with its lips accommodated within the slot. The fastener is retained in place on the application tool by spring fingers 14 secured to opposed sides of head 12 and adapted to bear against the lips 2 of the fastener. In use, the application tool with the fastener attached is inverted from the position shown in FIGURE 8 and placed over a stud with the stud axis in alignment with the centre of opening 3 of the fastener and with a central recess 15 in the slot 13, the recess 15 being designed to accommodate the protruding end of the stud. A substantial torque may then be applied to the fastener by means of the application tool, the sides of slot 13 bearing against the edges of the lips 2.

One of many possible uses of the fastener of the present invention is to secure in place an article, such as a panel, which is apertured so that a stud protruding from a support member may extend through the aperture and the fastener may be turned down the end of the stud onto the panel. In such applications, it may be important to ensure that moisture should not seep through the aperture in the panel and corrode the fastener so that the panel eventually works loose. With this in mind, the invention also includes embodiments in which the fastener is encapsulated in a plastics moulding shaped to form a self-threading nut, the bore of the nut being aligned with the opening in the base of the fastener. FIGURES 9 to 12 illustrate one such embodiment incorporating the fastener of FIGURES 1 to 3, and this embodiment also includes the preferred feature of an external downwardly inclined rim at the bearing end of the nut, this rim being designed to make liquid-sealing contact with the panel.

FIGURES 9 to 12 clearly show the fastener of FIGURES 1 to 3 encapsulated or moulded into a block of plastics material, in this instance nylon, shaped to form the body 16 of a hexagonal self-threading nut. It will be seen that the opening 3 of the fastener is aligned with bore 17 of the nut, but the thread-cutting projections 5 extend into bore 17, so as to cut into the outer surface of a stud introduced into the nut bore. As its external periphery, the bearing end 18 of the nut is extended outwardly to form a circular downwardly inclined rim 19 for the purpose indicated above. If necessary, the lips 2 of the fastener may be bent or corrugated in any convenient fashion to further retain the fastener within the plastics nut body 16 by a keying action. The slots 20 shown in the non-bearing end 21 of the nut are simply tooling aids in the moulding operation.

As an alternative to encapsulation of the fastener in a block of plastics material, ingress of moisture through the panel aperture may be prevented or sufficiently impeded by simply providing deformable sealing means on the side of the base 1 of the fastener opposed to that from which the guide flanges 4 extend, i.e. beneath the base of the fastener as illustrated in FIGURES 2, 6 and 7. Two methods of providing such sealing means are illustrated by way of example in FIGURE 13 and in FIGURES 14 to 16 respectively.

Figure 13:
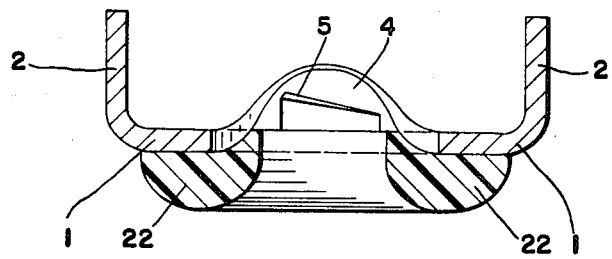
FIGURE 13 is a cross-sectional view somewhat similar to FIGURE 2, showing the self-threading fastener provided at its base with an annular plastisol sealing ring.

In the embodiment of FIGURE 13, the base 1 of the fastener is provided at its underside with an annular sealing ring 22 which surrounds and extends part-way into the opening 3. The sealing ring 22 is formed of plastisol material—suitably, closed cell PVC foam plastisol—which is applied to the base 1 in liquid form and subsequently "cured" by stoving. The process of curing in situ is also arranged to effect proper securing of the formed sealing ring to the fastener base.

Figure 14:
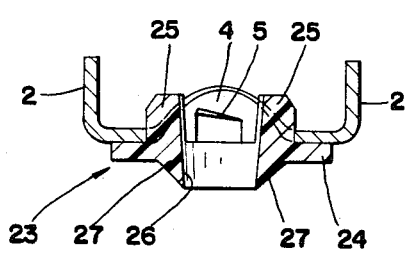
FIGURE 14 is a view, similar to FIGURE 13 and taken along the line XIV—XIV of FIGURE 15, showing the fastener provided with an alternative sealing means in the form of a separate insert of plastics material.
Figure 15:
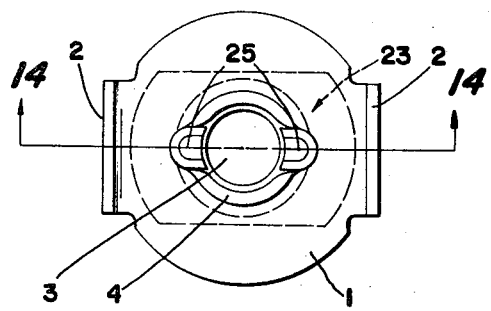
FIGURE 15 is a plan view corresponding to FIGURE 14.
Figure 16:
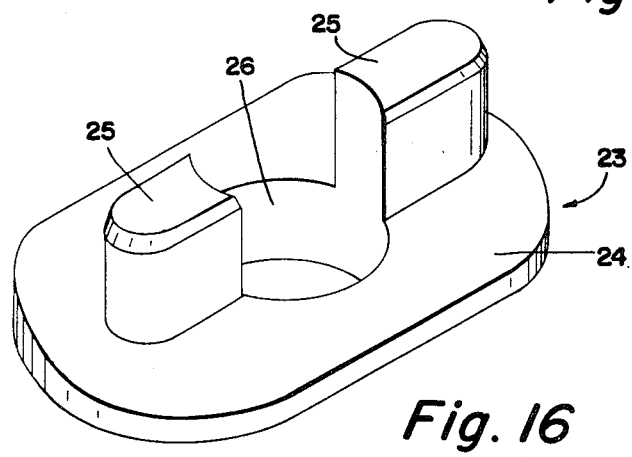
FIGURE 16 is a top perspective view of the insert shown in FIGURES 14 and 15.

The arrangement shown in FIGURES 14 to 16 employs a separate insert 23 of plastics material as the deformable sealing means. The particular insert illustrated in the figures is designed to be used with the fasteners of FIGURES 1 to 7, which have a pair of oppositely disposed guide flanges 4 formed by upsetting the metal on either side of a slot 9 (FIGURE 4) cut in the fastener blank. Whereas the whole central region of this slot 9 is enlarged to form opening 3 in the finished fastener, the ends of the slot remain open even when the completed fastener is turned down a stud, and advantage may be taken of this fact in designing the insert so that it is kept in place on the fastener. As best shown in FIGURE 16 the insert, which may for example be of moulded polyethylene or nylon, has a base portion 24 which is for the most part planar but is provided with a pair of upstanding lugs 25 shaped to frictionally engage in the open ends remaining from the slot cut out of the blank from which the cooperating fastener was fashioned. Lugs 25 serve to retain the insert in the fastener with base portion 24 of the insert lying against the fastener base 1 and with a central orifice 26 of the insert aligned with the fastener opening 3, as illustrated in FIGURES 14 and 15. At its underside, the insert 23 is formed with a projecting sealing ring or washer 27 which surrounds the central orifice 26 of the insert and the stud-receiving opening 3 of the fastener, and it is this sealing ring 27 which serves to impede the flow of moisture which might otherwise seep through a panel aperture when the fastener is turned down a stud into abutment with the panel.

What is claimed is:

1. A self-threading fastening device made from a piece of sheet metal for threading engagement with a threadless member comprising, a base having a central opening adapted for receiving a threadless member therethrough, a pair of oppositely disposed, laterally spaced upstanding guide flanges made integral with said base and extending upwardly from the periphery of said opening and on the same side of said base, said flanges having internal and external axially extending side walls, each of said flanges being curved in generally axial and radial directions so as to correspond generally to the curvature of said threadless member, said flanges extend convergently toward one another in a direction away from said base, whereby the transverse distance between the internal side walls of said flanges adjacent their junction with said base is greater than the maximum transverse of said threadless member received therebetween, and the transverse distance between the free ends of said flanges is approximately equal to said transverse dimension of said threadless member, and each of said flanges including a thread cutting projection formed from the material thereof and which extend radially inwardly from said internal side walls of the flanges for thread cutting engagement with said threadless member, said projections being disposed in axially spaced relationship on said internal side walls of said flanges and above the juncture of said flanges with said base.

2. A self-threading fastening device in accordance with claim 1, wherein each thread-cutting projection is angularly disposed with respect to the longitudinal central axis of said threadless member, and each projection including a leading portion and a trailing portion with the height and thickness of each projection increasing progressively in a direction from said leading portion to said trailing portion.

3. A self-threading fastening device in accordance with claim 1, wherein said projections are formed by shaving the material from the inner faces of said flanges, and wherein said flanges are formed by upsetting the material on either side of the opening in said base.

4. A self-threading fastening device in accordance with claim 1, wherein said base is of a generally hexagonal shape.

5. A self-threading fastening device in accordance with claim 1, wherein the general plane of said base is arched upwardly so as to urge the fastening device into tensioned relationship when turned down on said threadless member and into engagement with a support member.

6. A self-threading fastening device in accordance with claim 1, wherein the oppositely disposed edges of said base are bent upwardly to form lips adapted for co-operation with an application tool for mounting said device on said threadless member.

7. A self-threading fastening device in accordance with claim 6, wherein said base includes a partially circular peripheral portion disposed on opposite sides of said base and between said lips.

8. A self-threading fastening device in accordance with claim 1, wherein said base and flanges are disposed in encaspsulating relationship within a nut-like body of polymeric material, said nut-like body having a bore aligned with the opening in said base, and the thread-cutting projections extending into said bore.

9. A self-threading fastening device in accordance with claim 8, wherein said nut-like body includes an endless outwardly extending inclined flexible rim made integral therewith and adapted for liquid sealing engagement with the confronting surface of a support member.

10. A self-threading fastening device in accordance with claim 1, including a deformable sealing member made from a polymeric material disposed on said base on the side opposite from said flanges, and said sealing member extending partially into the opening in said base, and said sealing member having an aperture disposed in alignment with the opening in the base of said fastener.

11. A self-threading fastening device in accordance with claim 10, wherein said sealing member comprises an angular rim surrounding the opening in the base of said fastener and formed of a plastisol material secured to said base by curing in situ.

12. A self-threading fastening device in accordance with claim 10, wherein said sealing member comprises a detachable insert including a base portion adapted to be disposed in engagement with the confronting under surface of the base of said fastener, and an integral downwardly extending washer-like portion disposed in alignment with the opening in the base of said fastener.

13. A self-threading fastening device in accordance with claim 12, wherein said insert includes a pair of oppositely disposed upstanding lugs projecting upwardly from said base portion on opposite sides of the aperture therein, and said lugs having an arcuate outer surface adapted to be inserted and frictionally held within the opening in the base of said fastener in the installed position thereof.

References Cited

UNITED STATES PATENTS

| | | | |
|---|---|---|---|
| 2,279,169 | 4/1942 | Kost | 85—36 |
| 2,417,262 | 3/1947 | Morehouse | 85—36 |
| 2,639,789 | 5/1953 | Rosenberg | 85—50 |
| 2,782,385 | 2/1957 | Collett | 285—379 |
| 2,901,938 | 9/1959 | Van Buren | 85—32 |
| 3,060,538 | 10/1962 | Simi | 85—32 |
| 3,131,742 | 5/1964 | Munse | 85—32 |
| 3,137,197 | 6/1964 | Meyer | 85—32 |
| 3,264,699 | 8/1966 | Knowlton | 85—36 |
| 3,283,639 | 11/1966 | Holton | 85—32 |

FOREIGN PATENTS

| | | |
|---|---|---|
| 1,286,513 | 1/1962 | France. |

OTHER REFERENCES

Dot Publication: Carr Fastener Co., dated October 1956.

MARION PARSONS, JR., *Primary Examiner.*